(12) United States Patent
Huang

(10) Patent No.: US 8,289,653 B2
(45) Date of Patent: Oct. 16, 2012

(54) ABS WITH A LUBRICATION CONTROL DAM FOR HARD DISK DRIVES

(75) Inventor: Weidong Huang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 226 days.

(21) Appl. No.: 12/707,484

(22) Filed: Feb. 17, 2010

(65) Prior Publication Data

US 2011/0199704 A1 Aug. 18, 2011

(51) Int. Cl.
- G11B 21/21 (2006.01)
- G11B 17/32 (2006.01)
- G11B 5/60 (2006.01)

(52) U.S. Cl. .................. 360/235.6; 360/236; 360/236.3

(58) Field of Classification Search .............. 360/234.3, 360/235.4, 235.5, 235.6, 236, 236.3, 236.4, 360/237

See application file for complete search history.

(56) References Cited

U.S. PATENT DOCUMENTS

| 5,404,256 A * | 4/1995 | White ....................... 360/236.3 |
| 5,917,678 A | 6/1999 | Ito et al. |
| 5,940,249 A | 8/1999 | Hendriks |
| 6,021,020 A | 2/2000 | Itoh et al. |
| 6,125,005 A * | 9/2000 | Lee et al. ................... 360/236.3 |
| 6,157,519 A * | 12/2000 | Kohira et al. ................ 360/237 |
| 6,459,546 B1 * | 10/2002 | Mundt et al. ................ 360/236.3 |
| 6,678,119 B1 | 1/2004 | Pendray et al. |
| 6,690,545 B1 * | 2/2004 | Chang et al. .................. 360/237 |
| 6,920,015 B2 | 7/2005 | Mundt et al. |
| 6,989,967 B2 | 1/2006 | Pendray et al. |
| 7,227,723 B2 | 6/2007 | Nath et al. |
| 7,230,797 B1 | 6/2007 | Liu |
| 7,245,455 B2 | 7/2007 | Rajakumar |
| 7,277,255 B2 | 10/2007 | Ueno et al. |
| 7,760,468 B2 * | 7/2010 | Cha et al. .................... 360/235.6 |
| 2002/0048120 A1 * | 4/2002 | Boutaghou et al. ......... 360/236.3 |
| 2002/0071215 A1 * | 6/2002 | Lewis et al. ................ 360/235.7 |
| 2004/0095680 A1 | 5/2004 | Takahashi |
| 2005/0207065 A1 * | 9/2005 | Takagi ........................ 360/235.6 |
| 2006/0268460 A1 | 11/2006 | Kondo |
| 2007/0047145 A1 | 3/2007 | Matsumoto |
| 2007/0103816 A1 | 5/2007 | Nakakita et al. |
| 2007/0121238 A1 | 5/2007 | Kondo et al. |
| 2007/0188925 A1 | 8/2007 | Ishihara |
| 2007/0211385 A1 | 9/2007 | Kondo et al. |
| 2008/0112084 A1 | 5/2008 | Hu et al. |

* cited by examiner

Primary Examiner — Craig A. Renner

(74) Attorney, Agent, or Firm — Patterson & Sheridan, LLP

(57) ABSTRACT

A method and apparatus for controlling lubrication in hard disk drives. Hard disk drives often include lubrication on the disks to protect the disks from incidental contact with the head slider. Embodiments of the invention include lubrication control surfaces or dams on the air bearing surface (ABS) of the head slider. The dams redirect air flow on the ABS and/or redirects excess lubrication that migrates from the disk to the head slider. By redirecting excess lubrication, the lubrication control dams remove and/or store the lubrication and avoid failure that may occur as a result of the lubrication interfering with the ABS or the read/write elements of the head.

20 Claims, 3 Drawing Sheets

ABS WITH A LUBRICATION CONTROL DAM FOR HARD DISK DRIVES

BACKGROUND OF THE INVENTION

1. Field of the Invention

Embodiments of the invention generally relate to the field of hard disk drives. More specifically, embodiments of the invention relate methods and apparatus to control lubrication migration on head sliders in hard disk drives.

2. Description of the Related Art

Hard disk drives are used in many computer system operations. In fact, many computing systems operate with some type of hard disk drive to store the most basic computing information, e.g., the boot operation, the operating system, the applications, etc. In general, the hard disk drive is a device, which may or may not be removable, but without which, some computing systems may not operate.

One basic hard disk drive model was developed approximately 40 years ago and in some ways resembles a phonograph type apparatus. For instance, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA). The assembly consisting of the disks, HGAs, spindle, housing, and the other parts internal to the housing is called the head disk assembly, or HDA.

In operation, the hard disk is rotated at a set speed via a spindle motor assembly having a central drive hub. Additionally, there are channels or tracks spaced at known intervals across the disk. Most current embodiments arrange the signal regions in concentric circular tracks, but other designs, such as spirals or irregular closed or open paths are possible and useful. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk. Refinements of the disk and the head have provided reductions in the size of the hard disk drive. For example, the original hard disk drive had a disk diameter of 24 inches. Modern hard disk drives are much smaller and include disk diameters of less than 2.5 inches.

The ever increasing need for data storage has led some disk drive makers to steadily increase the amount of data stored on a drive. Mechanical considerations, radiated audible noise limits, power requirements, and other factors limit the number of disks that can be economically combined in a single drive. Thus, disk drive technology has generally focused on increasing the amount of data stored on each disk surface by positioning the heads more closely to the media surface. However, care must be taken to avoid unintended contact between the head components and the moving media surface.

Typically, the heads are lightly spring loaded, with the spring tension perpendicular to the media surface plane and directed against the media surface. An air bearing separates the head and media surfaces as follows: As the media moves relative to the head, air is dragged by the disk surface through specifically designed channels in the surface of the head adjacent to the media surface. The surface of the head and the channels contained therein, collectively referred to as the air-bearing surface (ABS), are designed to generate regions of increased air pressure in between the ABS and media surface that forces the head away from direct contact with the media surface, in effect causing the head to fly above the media surface. The separation of the head ABS and media surface, commonly called fly height, is a complex phenomenon primarily a function of air density, the spring preload, the relative speed between the head and media surface, and the pattern of channels present on the head air bearing surface adjacent to the media surface. It is well known to those familiar with head-disk interface design that a particular head-disk combination will not fly precisely at the desired separation. Variances in mechanical tolerances, spring tensions, and other factors result in a nearly normal statistical fly-height population distribution generally centered about the mean fly height. Furthermore, the head and its mounting gimbal are subject to mechanical tolerances, aerodynamic forces, and inertial forces that can cause it to deviate from the desired attitude with respect to the media surface, (e.g. static and dynamic pitch and roll). This can move some areas of the air bearing surface closer or further from the media surface.

SUMMARY OF THE INVENTION

Accordingly, what is needed is an air bearing surface (ABS) design that will continue to function reliably at ultra-low fly heights, even in the presence of lubrication contamination.

In one embodiment the invention is a method of controlling lubrication migration on a head slider of a hard disk drive the head slider having a leading edge, two side edges, a trailing edge and an air bearing surface (ABS) wherein the leading edge, two side edges and the trailing edge define a perimeter of the ABS. The method includes: providing a trailing pad on the ABS, wherein the trailing pad is adjacent to the trailing edge; providing a front pad on the ABS, wherein the front pad is adjacent the leading edge; providing a laterally extending channel disposed between the trailing pad and the front pad; and providing a laterally extending dam disposed between the laterally extending channel and the front pad, the laterally extending dam defined by a top surface and one or more side walls, wherein the laterally extending dam is sized and positioned to perform at least one of redirecting air flow on the ABS, redirecting lubrication flow and storing lubrication; wherein a floor of the laterally extending channel defines a reference level and the front pad and the trailing pad are at a first height above the reference level.

In another embodiment, the invention is a head slider of a hard disk drive. The head slider includes: a leading edge; two side edges; a trailing edge; and an air bearing surface (ABS), the leading edge, two side edges and the trailing edge defining a perimeter of the ABS. The ABS has: a trailing pad adjacent to the trailing edge; a front pad adjacent to the leading edge; a laterally extending channel disposed between the trailing pad and the front pad; and a laterally extending dam disposed between the laterally extending channel and the front pad, the laterally extending dam defined by a top surface and one or more side walls; wherein the laterally extending dam is sized and positioned to perform at least one of redirecting air flow on the ABS, redirecting lubrication flow and storing lubrication, a floor of the laterally extending channel is at a reference level and the front pad and the trailing pad are at a first height above the reference level.

In a further embodiment, the invention is a hard disk drive including a disk, the disk including lubrication thereon, and a head slider. The head slider includes: a leading edge; two side edges; a trailing edge; and an air bearing surface (ABS), the leading edge, two side edges and the trailing edge defining a perimeter of the ABS. The ABS has: a trailing pad adjacent to the trailing edge; a front pad adjacent to the leading edge; a laterally extending channel disposed between the trailing pad and the front pad; and a laterally extending dam disposed between the laterally extending channel and the front pad, the laterally extending dam defined by a top surface and one or more side walls; wherein the laterally extending dam is sized and positioned to perform at least one of redirecting air flow on the ABS, redirecting lubrication flow and storing lubrication, a floor of the laterally extending channel is at a reference level and the front pad and the trailing pad are at a first height above the reference level.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
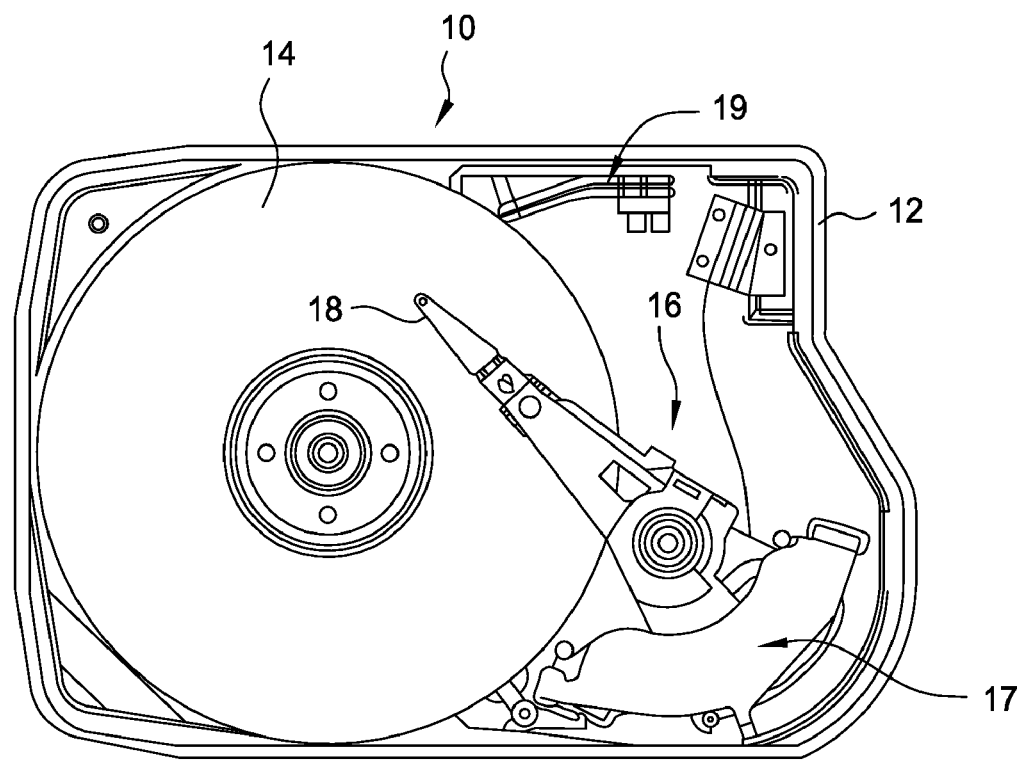
FIG. 1 shows an exemplary disk drive having a magnetic disk, and a head slider mounted on an actuator, according to embodiments of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As was noted above, fly height may vary for any number of reasons. Reducing the fly-height, while advantageously increasing the signal-to-noise ratio of the recovered signal, can undesirably lead to reduced disk drive reliability. Such reliability reduction can occur in the presence of particulate or lubrication contamination. Particulate contamination can include wear particles from drive components and/or airborne contaminates from the ambient surroundings. Lubrication contamination can occur from the protective lubrication on the disk surface migrating to the head slider surfaces. Such lubrication contaminants can accumulate on the air bearing surface. The buildup of lubrication contaminants can disrupt air flow, thus causing the head to fly higher or lower than desired, or at a different orientation relative to the media surface than desired. The lubrication buildup can also bridge the narrow fly height gap. This can lead to fouling and contact between the head and media. The resulting contact can generate more lubrication migration to the head slider, which can further exacerbate contamination. This can lead to drive failure that can occur rapidly by this mode.

Lubrication that is picked up on the head slider's ABS, will travel toward the trailing edge of the head slider, due to the air shear stress present while the head slider is "flying" over the disk surface. Further, lubrication that is deposited on the trailing edge, may migrate back onto the ABS. Often, the read/write head is on a pad that is near the trailing edge. Thus, lubrication buildup may collect near the read/write head transducer elements. Many components of the transducer elements have significant ferromagnetic properties. Thus, the magnetic sensitivity of a drive read element can be distorted and reduced, which can lead to lowered signal to noise ratios and drive failure. In an optical drive, lubrication can distort and/or occlude the optical path, which can result in poor performance.

Embodiments of the invention provide lubrication control methods and apparatus for head sliders in hard disk drives. One embodiment provides an air bearing surface (ABS) having one or more raised surfaces for redirecting air flow, redirecting lubrication flow and storing or trapping excess lubrication on the ABS. Therefore, embodiments of the invention allow the ABS to be effectively positioned in reference to the disk surface without (or with relatively less) lubrication buildup on the ABS. Fouling, head-disk contact, reduced transducer signal-to-noise ratio, and other detrimental outcomes of lubrication buildup are deterred with one or more recesses according to embodiments of the invention.

FIG. 1 shows one embodiment of a magnetic hard disk drive 10 that includes a housing 12 within which a magnetic disk 14 is fixed to a spindle motor (SPM) by a clamp. The SPM drives the magnetic disk 14 to spin at a certain speed. A head slider 18 accesses a recording area of the magnetic disk 14. The head slider 18 has a head element section and a slider to which the head element section is fixed. The head slider 18 is provided with a fly-height control which adjusts the flying height of the head above the magnetic disk 14. An actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the actuator 16 toward the magnetic disk 14. In some embodiments, the head slider 18 may have raised areas or portions (such as pads) that actually contact disk 14, as opposed to the slider head "flying" over the disk 14. In some embodiments, the disk drive 10 may include a ramp 19, where the head slider 18 is parked when the disk drive 10 is not in operation and disk 14 is not rotating.

Figure 2:
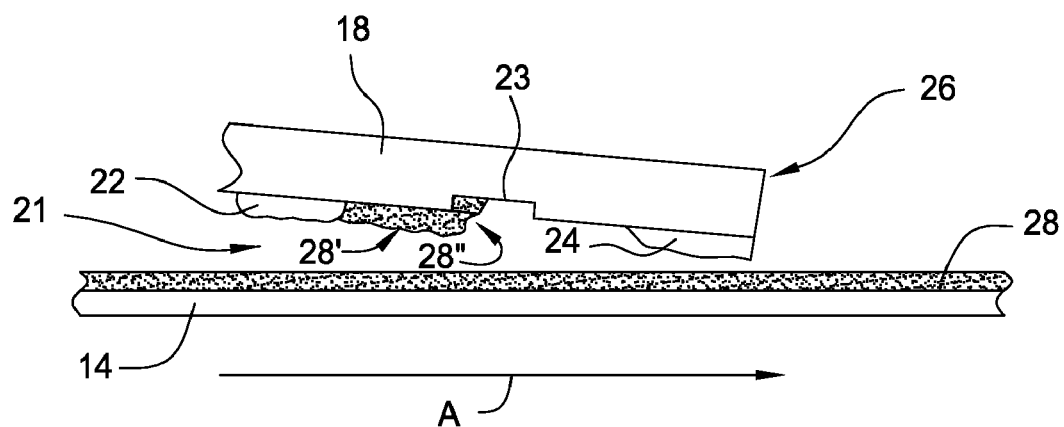
FIG. 2 is a side view of the head slider and magnetic disk of the disk drive of FIG. 1, according to embodiments of the invention.

FIG. 2 is a side view of the head slider 18 and the magnetic disk 14 of FIG. 1. Magnetic disk 14 is moving in the direction of arrow A, and causes airflow in the same direction. This airflow flows over the air bearing surface (ABS) 21 of the head slider 18 and produces the lifting pressure described above. In one embodiment, head slider 18 includes raised areas such as front pad 22 and trailing pad 24, and recessed areas such as transverse or lateral channel 23. The recessed areas, lateral channel 23 in this embodiment, are those surfaces of the ABS furthest from the disk 14, and include a floor that defines a reference level of the ABS as described below. Trailing pad 24, in one embodiment is located adjacent to and centered relative to, the trailing edge 26 of the head slider 18, may further include the read/write head that writes and reads data to and from magnetic disk 14. Front pad 22, in one embodiment is located adjacent to and centered relative to, the leading edge (39 in FIG. 3) of the head slider 18. Disk 14 has a lubricant 28 on its upper surface to protect the disk 14 from contact with the head slider 18 and/or other components of the disk drive. In operation, lubricant 28 may migrate onto head slider 18. Lubricant on forward portions of the head slider 18, such as that labeled 28', will migrate toward the trailing edge 26 of the head slider 18 as it is acted upon by the air flowing over the ABS of the head slider 18. The lubricant will collect on different areas of the ABS including in the lateral channel 23 as shown by lubricant 28". The lubricant 28" in the lateral channel 23 of head slider 18 may flow onto trailing pad 24 and interfere with the read and write elements or other functional portions of the read/write head.

Figure 3:
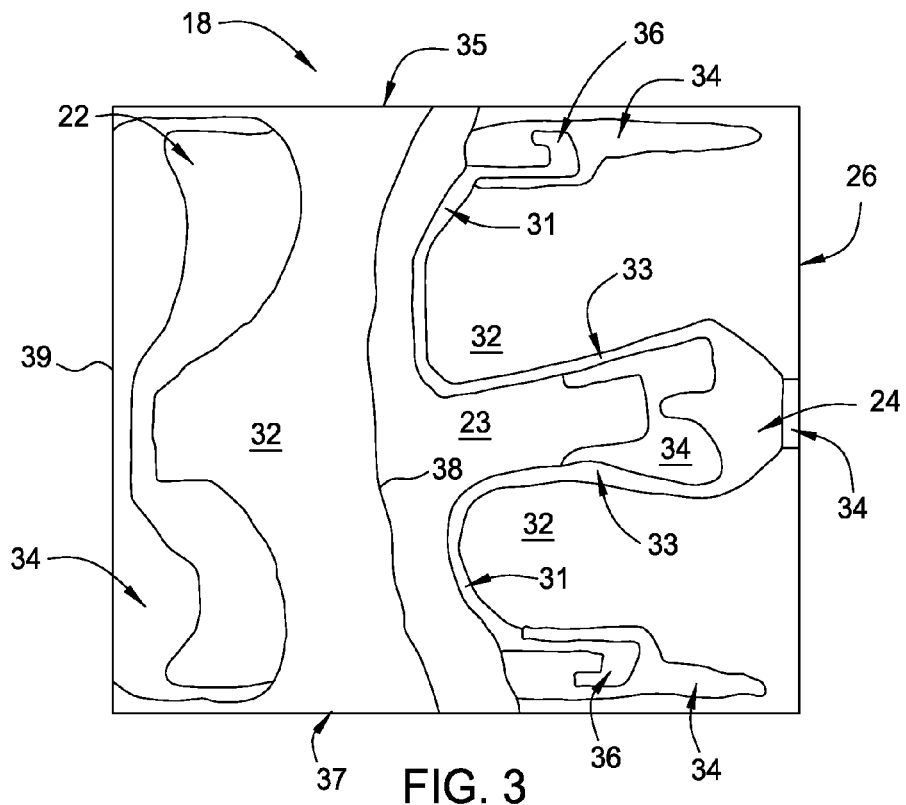
FIG. 3 is a plan view of the bottom of head slider of FIGS. 1 and 2, showing the air bearing surface (ABS) of the head slider, according to embodiments of the invention.
Figure 4:
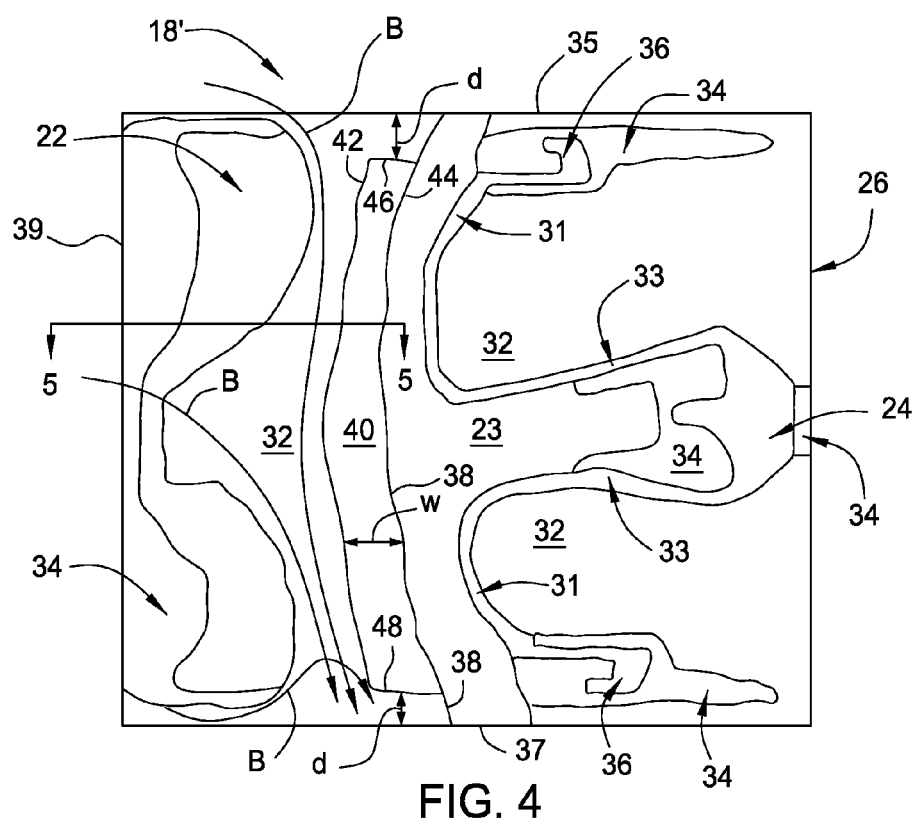
FIG. 4 is a plan view of the bottom of head slider of FIGS. 1 and 2, showing the air bearing surface (ABS) of the head slider, including a raised surface, according to embodiments of the invention.

FIG. 3 shows one embodiment of the bottom of head slider 18 of FIGS. 1 and 2, from the air bearing surface (ABS) of the head slider. The head slider 18 includes a leading edge 39, a trailing edge 26 and side edges 35 and 37, that define the perimeter of the ABS. The ABS includes first recessed surfaces 23 having a floor at a reference level, which in some embodiments are those surfaces at the furthest distance from disk 14 (as seen in FIG. 2). Second surfaces 32 are at a first height above the recessed surfaces 23 (reference level) and are closer to the disk 14. Third, raised surfaces are at a second height above the first height, such as front pad 22 and trailing pad 24. In some embodiments, surfaces 34 are included at a height in between the first and second height. In the embodiment as shown in FIGS. 3 and 4, the first recessed surfaces 23 form a laterally extending channel from one side 35 of the head slider 18 to the other side 37 of the head slider 18. The laterally extending channel 23 includes a front surface 38 where it meets the second surfaces 32.

Those raised surfaces at the highest, second height, (closest to the disk) such as front pad 22 and trailing pad 24 act as air-support surfaces. In some embodiments, other air support surfaces at the second height are included such as side pads 36. Also in the embodiment shown in FIGS. 3 and 4 arms connect the trailing pad 24 and the side pads 36. Both arms include a longitudinally extending portion 33 and a laterally extending portion 31. It should be understood that the arrangement of surfaces as shown in FIGS. 3 and 4, is only one particular arrangement of raised and recessed surfaces that may be present on the ABS of a head slider, and should not be considered limiting in terms of the invention, and is only provided here as an example. As air flows over the ABS surface, there are certain areas that act as gathering points for lubrication that is picked-up from the disk 14 (see FIG. 2). If too much lubricant is collected in these areas, the lubricant may affect the read and write elements or other functional portions of the read/write head (not shown) that are, in one embodiment of the invention, mounted on trailing pad 24.

FIG. 4 shows another embodiment of the bottom of head slider 18' of FIGS. 1 and 2, from the air bearing surface (ABS) of the head slider. As described with reference to the head slider embodiment of FIG. 3, the ABS in FIG. 4 includes first recessed surfaces 23 at a reference level which in some embodiments are those surfaces at the furthest distance from disk 14 (as seen in FIG. 2). Second surfaces 32 are at a first height above the recessed surfaces 23 (reference level) and are closer to the disk 14. Third raised surfaces are at a second height above the first height, such as front pad 22 and trailing pad 24. In some embodiments, surfaces 34 are included at a height in between the first and second height. In the embodiment as shown in FIGS. 3 and 4, the first recessed surfaces 23 form a laterally extending channel from one side 35 of the head slider 18 to the other side 37 of the head slider 18. Those raised surfaces at the highest, second height, (closest to the disk) such as front pad 22 and trailing pad 24 act as air-support surfaces. In some embodiments, other air support surfaces at the second height are included such as side pads 36. Also in the embodiment shown in FIGS. 3 and 4 arms connect the trailing pad 24 and the side pads 36. Both arms include a longitudinally extending portion 33 and a laterally extending portion 31.

As shown in FIG. 4, head slider 18' includes one embodiment of a raised surface that is sized and positioned to redirect air flow, redirect lubrication flow and store or trap excess lubrication on the ABS, in the form of a laterally extending dam 40. Lubrication that is picked-up from the disk 14, may collect on various areas of the ABS, and as previously described, may migrate back onto pad 24 such that the lubricant may affect the read and write elements or other functional portions of the read/write head. The provision of the laterally extending dam 40 may mitigate this detrimental result in that the laterally extending dam 40 directs the airflow (shown as arrows B), to the side 37 of the head slider 18'. The arrows B are also indicative of lubrication flow in front of the laterally extending dam 40. The laterally extending dam 40 directs the lubrication off of the ABS surface and prevents the lubrication from flowing back and forth through the region.

In the embodiment of FIG. 4, the laterally extending dam 40 is an elongated raised region having a first elongated side 44 adjacent the laterally extending channel 23, a second elongated side 42 facing the front pad, and two sides 46, 48 adjacent to the side edges 35, 37, respectively. The side edge 35 faces the outer edge of disk 14, while the side edge 37 faces the center of disk 14, (see FIG. 1). The dam 40 has a width w and extends laterally within a distance d of the side edges 35 and 37 of the head slider 18'. The width of the laterally extending dam 40 is between about 2 μm and about 100 μm. The width may vary along the length of the laterally extending dam 40, or, alternatively may be constant along the length of the laterally extending dam 40. The distance d from the side edges 35 and 37 of the head slider 18' to the laterally extending dam 40 is between about 0 μm (aligned with the side edge) and about 650 μm. The distance between one side edge and the laterally extending dam 40 and the other side edge, may be the same, or alternatively the laterally extending dam 40 may extend closer to one side than the other.

Illustratively, FIG. 4 shows the dam 40 as being curved; however, in some embodiments, the dam 40 may be straight. Further, in some embodiments the dam 40 may be parallel to the leading edge 39 and the trailing edge 26, while in other embodiments the dam 40 is slanted with respect to the leading edge 39 and the trailing edge 26. In the embodiment of FIG. 4, the first elongated side 44 of the dam is aligned with the front surface 38 of the laterally extending channel 23. In other embodiments, the first elongated side 44 may be closer to the leading edge 39 than the front surface 38 of the laterally extending channel 23, such that a strip of second surfaces 32 at the second height may extend between the first elongated side 44 and the front surface 38 of the laterally extending channel 23, as described below with respect to FIG. 5.

Figure 5:
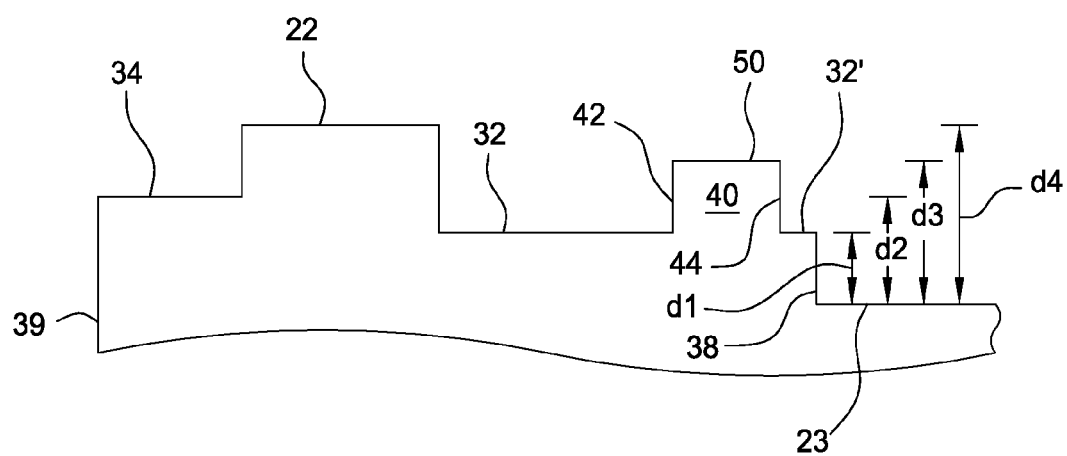
FIG. 5 is an enlarged cross section of a portion of the head slider of FIG. 4 taken through line 5-5.

FIG. 5 is a cross-sectional view through line 5-5 of FIG. 4, showing the relative heights (not to scale) of the different surfaces of the ABS. The heights are described with respect to the first recessed surfaces 23 (the laterally extending channel) that are at a reference level (furthest distance from disk 14 as seen in FIG. 2). The second surfaces 32 are at a first height closer to the disk 14 and above the reference level by a distance d1. In one embodiment, d1 is between about 10 μm and about 20 μm. In some embodiments, third, raised surfaces are at a second height d4 above the reference level, such as front pad 22 and trailing pad 24. The second height being above the first height. In one embodiment, d4 is between about 10 μm and about 20 μm. In some embodiments, surfaces 34 are included at a height d2, that is in between the first and second height. In one embodiment, d2 is between about 10 μm and about 20 μm. In the embodiment as shown in FIGS. 3 and 4, the first recessed surfaces 23 form a laterally extending channel from one side 35 of the head slider 18 to the other side 37 of the head slider 18. Those raised surfaces at the highest, second height, (closest to the disk) such as front pad 22 and trailing pad 24 act as air-support surfaces. In some embodiments, other air support surfaces at the second height are included, such as side pads 36. Also in the embodiment shown in FIGS. 3 and 4 arms connect the trailing pad 24 and the side pads 36. Both arms include a longitudinally extending portion 33 and a laterally extending portion 31.

Also shown in FIG. 5, is the relative height of the dam 40. The dam 40 includes a top surface 50 that is at a height d3 above the first recessed surfaces 23. In one embodiment, d3 is between about 10 μm and about 20 μm. The sidewalls of the dam extend from the second height d1 to the top surface 50. In some embodiments, the top surface 50 is relatively flat, while in other embodiments, the height d3 of the top surface may vary along the width of the dam 40, the length of the dam 40, or both. In the embodiment shown in FIG. 5, the first elongated side 44 of the dam 40 is closer to the leading edge 39 than the front surface 38 of the laterally extending channel 23, such that a strip of second surfaces 32' at the second height extends between the first elongated side 44 and the front surface 38 of the laterally extending channel 23. The distance between the first elongated side 44 of the dam 40 and the front surface 38 of the laterally extending channel 23, in one embodiment is between about 0 μm (when they are aligned) and about 200 μm. In other embodiments, as shown in FIG. 4, the first elongated side 44 of the dam 40 and the front surface 38 of the laterally extending channel 23 are aligned with one another. While the figures show the sides 42, 44, 46 and 48 of the dam 40 as being orthogonal to the top surface 50, in other embodiments, the sides may be slanted or curved.

While the foregoing is directed to embodiments of the present invention, other and further embodiments of the invention may be devised without departing from the basic scope thereof, and the scope thereof is determined by the claims that follow.

What is claimed is:

1. A head slider of a hard disk drive, the head slider comprising:
    a leading edge;
    first and second side edges;
    a trailing edge; and
    an air bearing surface (ABS), the leading edge, the first and second side edges and the trailing edge defining a perimeter of the ABS, the ABS comprising:
        a trailing pad adjacent to the trailing edge;
        a front pad adjacent to the leading edge;
        a laterally extending channel disposed between the trailing pad and the front pad such that a first end of the channel is at the first side edge and a second end of the channel is at the second side edge; and
        a laterally extending dam disposed between the laterally extending channel and the front pad, the laterally extending dam defined by a top surface and one or more side walls; wherein a floor of the laterally extending channel is at a reference level, wherein the front pad and the trailing pad have respective heights above the reference level, and wherein the top surface of the laterally extending dam is between about 10 μm and about 20 μm above the reference level.

2. The head slider of claim 1 wherein the laterally extending dam extends approximately parallel to the trailing edge of the head slider.

3. The head slider of claim 1 wherein the one or more sidewalls of the laterally extending dam comprise:
    a first elongated side adjacent the laterally extending channel,
    a second elongated side facing the front pad, and
    two sides adjacent to the first and second side edges of the head slider.

4. The head slider of claim 3 wherein the laterally extending dam has a width between the first and second elongated sides that is between about 2 μm and about 100 μm.

5. The head slider of claim 3 wherein the first elongated side is spaced between about 0 μm and about 200 μm away from a front surface of the laterally extending channel.

6. The head slider of claim 3 wherein the first elongated side is aligned with a front surface of the laterally extending channel.

7. The head slider of claim 3 wherein the two sides of the laterally extending dam are between about 0 μm and about 650 μm away from the first and second side edges of the head slider.

8. A method of fabricating a head slider of a hard disk drive, the head slider having a leading edge, first and second side edges, a trailing edge and an air bearing surface (ABS) wherein the leading edge, the first and second side edges and the trailing edge define a perimeter of the ABS, the method comprising:
    providing a trailing pad on the ABS, wherein the trailing pad is adjacent to the trailing edge;
    providing a front pad on the ABS, wherein the front pad is adjacent the leading edge;
    providing a laterally extending channel disposed between the trailing pad and the front pad such that a first end of the channel is at the first side edge and a second end of the channel is at the second side edge; and
    providing a laterally extending dam disposed between the laterally extending channel and the front pad, the laterally extending dam defined by a top surface and one or more side walls, wherein a floor of the laterally extending channel defines a reference level, wherein the front pad and the trailing pad have respective heights above the reference level, and wherein the top surface of the laterally extending dam is between about 10 μm and about 20 μm above the reference level.

9. The method of claim 8, wherein the laterally extending dam is sized and positioned to perform at least one of redirecting air flow on the ABS, redirecting lubrication flow, and storing lubrication.

10. The method of claim 8, wherein the respective heights of the front and trailing pads are the same.

11. A hard disk drive, comprising:
    a disk, the disk including lubrication thereon; and a head slider, the head slider comprising:
   a leading edge;
   first and second side edges;
   a trailing edge; and
   an air bearing surface (ABS), the leading edge, the first and second side edges and the trailing edge defining a perimeter of the ABS, the ABS comprising:
      a trailing pad adjacent to the trailing edge;
      a front pad adjacent to the leading edge;
      a laterally extending channel disposed between the trailing pad and the front pad such that a first end of the channel is at the first side edge and a second end of the channel is at the second side edge; and
      a laterally extending dam disposed between the laterally extending channel and the front pad, the laterally extending dam defined by a top surface and one or more side walls, a floor of the laterally extending channel is at a reference level, wherein the front pad and the trailing pad have respective heights above the reference level, and wherein the top surface of the laterally extending dam is between about 10 μm and about 20 μm above the reference level.

12. The hard disk drive of claim 11, wherein the laterally extending dam is sized and positioned to perform at least one of redirecting air flow on the ABS, redirecting lubrication flow, and storing lubrication.

13. The method of claim 8, wherein the top surface of the laterally extending dam is between 10 μm and about 20 μm above the reference level.

14. The method of claim 8 wherein the laterally extending dam extends approximately parallel to the trailing edge of the head slider.

15. The method of claim 8 wherein the one or more sidewalls of the laterally extending dam comprise:
   a first elongated side adjacent the laterally extending channel,
   a second elongated side facing the front pad, and
   two sides adjacent to the first and second side edges of the head slider.

16. The method of claim 15 wherein the laterally extending dam has a width between the first and second elongated sides that is between about 2 μm and about 100 μm.

17. The method of claim 15 wherein the first elongated side is spaced between about 0 μm and about 200 μm away from a front surface of the laterally extending channel.

18. The method of claim 15 wherein the first elongated side is aligned with a front surface of the laterally extending channel.

19. The method of claim 15 wherein the two sides of the laterally extending dam are between about 0 μm and about 650 μm away from the first and second side edges.

20. The head slider of claim 1, wherein the laterally extending dam is sized and positioned to perform at least one of redirecting air flow on the ABS, redirecting lubrication flow, and storing lubrication.

* * * * *